G. W. Shipman,
Circular Saw Guard.
No. 112,504. Patented Mar. 7, 1871.

Witnesses:
A. Bennelsendorf.
Gustave Dietrich.

Inventor:
G. W. Shipman.
Per Munn & Co.
Attorneys.

UNITED STATES PATENT OFFICE.

GEORGE W. SHIPMAN, OF ISCHUA, NEW YORK.

IMPROVEMENT IN GUARDS FOR CIRCULAR SAWS.

Specification forming part of Letters Patent No. 112,504, dated March 7, 1871.

*To all whom it may concern:*

Be it known that I, GEORGE W. SHIPMAN, of Ischua, in the county of Cattaraugus and State of New York, have invented a new and useful Improvement in Circular-Saw Guard; and I do hereby declare that the following is a full, clear, and exact description thereof, which will enable others skilled in the art to make and use the same, reference being had to the accompanying drawing, forming part of this specification.

This invention relates to a new and useful improvement in means for protecting the operator and others near running circular saws from injury; and it consists in a movable guard, operated by means of the saw-carriage in such a manner that, during the period of danger, (when the saw is not cutting,) the guard covers the saw, and is thrown back from the saw when the latter is in actual use, as will be hereinafter more fully described.

Figure 1:
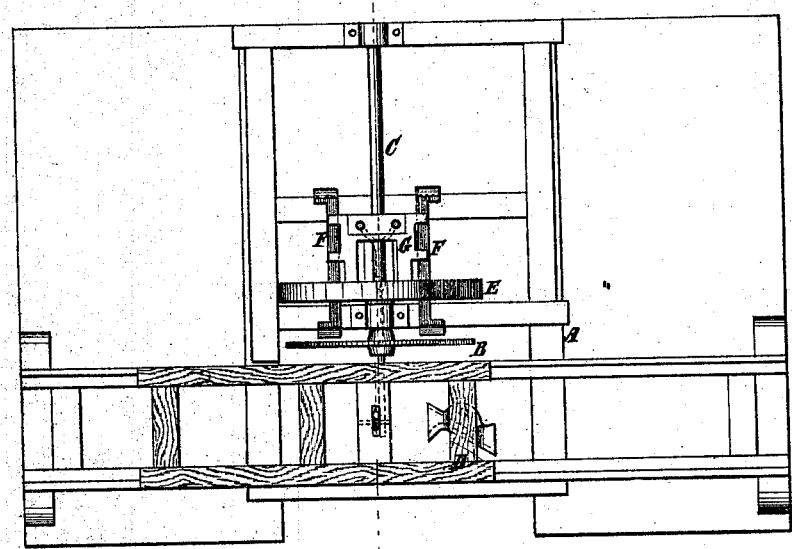
Figure 3:
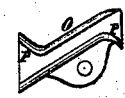
Figure 2:
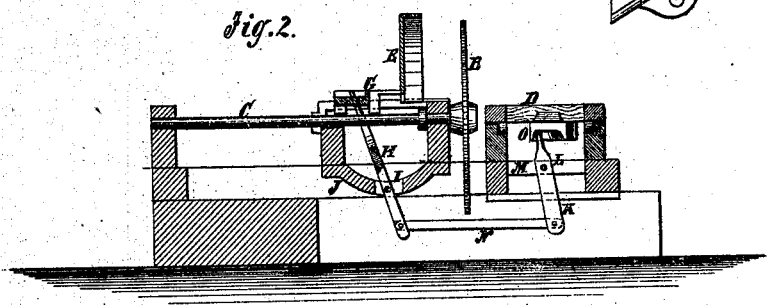

In the accompanying drawing, Figure 1 represents a top or plan view of the machine, showing the guard thrown back from the saw. Fig. 2 is a vertical section of Fig. 1 on the line *x x.* Fig. 3 represents the shoe, which is placed on the under side of the carriage, by means of which the guide is moved.

Similar letters of reference indicate corresponding parts.

A is the saw-frame. B is the saw. C is the saw-arbor. D is the saw-carriage. E is the saw-guard. This guard is placed back of the saw and over the arbor, and is made to move back and forth on the ways F F, which are placed upon the frame parallel with the arbor. The guard is attached to a slide or carriage, G, which moves on the ways.

H is a lever, which has its fulcrum at I, in a mortise through the piece J on the under side of the frame. The upper portion of the lever H is a fork, the ends of which pass up through holes in the slide G, as seen in the drawing.

K is a lever, which has its fulcrum at L in the cross-piece M, beneath the carriage-frame. N is a bar, which connects the lower ends of the two levers H and K.

O is a shoe, which is attached to the forward end and under side of the carriage D. This shoe is grooved on its under side, with the groove enlarged at each end. The sides of the groove form inclined planes when the shoe is placed obliquely on the carriage, as seen in Fig. 1, which serve to throw the upper end of the lever K back and forth as the carriage D is moved forward and backward in sawing. This action of the lever K operates the lever H, and serves to throw the guard toward and from the saw.

When the piece to be sawed is placed upon the carriage D and moved toward the saw, the shoe O will engage with the lever K, so as to throw the top of that lever toward the saw. This action throws the guard from the saw into the position seen in the drawing, leaving sufficient space inside of the saw clear for the passage of the lumber. As the carriage is drawn back, the shoe again engages with the lever K and throws it back to its former position, which moves the guard over the saw, covering its cutting-edge and effectually preventing any damage or injury therefrom. The curves P P on the opposite incline planes of the shoe O serve to guide the end of the lever into the groove when the shoe is moved in either direction.

By this arrangement the guard E is made automatic in its movements and sure in its action.

Having thus described my invention, I claim as new and desire to secure by Letters Patent—

A guard, E, for circular saws, arranged to be automatically moved back and forth, substantially as described.

GEORGE W. SHIPMAN.

Witnesses:
   D. C. CORTHELL,
   WESLEY LEWIS.